(12) United States Patent
Murashige et al.

(10) Patent No.: US 10,688,759 B2
(45) Date of Patent: Jun. 23, 2020

(54) METHOD FOR MANUFACTURING OPTICAL LAMINATE

(71) Applicant: NITTO DENKO CORPORATION, Ibaraki-shi, Osaka (JP)

(72) Inventors: Takeshi Murashige, Ibaraki (JP); Junichi Inagaki, Ibaraki (JP); Kazuhito Hosokawa, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/743,726

(22) PCT Filed: Jul. 13, 2016

(86) PCT No.: PCT/JP2016/070640
§ 371 (c)(1),
(2) Date: Jan. 11, 2018

(87) PCT Pub. No.: WO2017/010498
PCT Pub. Date: Jan. 19, 2017

(65) Prior Publication Data
US 2018/0207910 A1 Jul. 26, 2018

(30) Foreign Application Priority Data
Jul. 15, 2015 (JP) .................................. 2015-141266

(51) Int. Cl.
*B32B 17/10* (2006.01)
*C03B 17/06* (2006.01)
(Continued)

(52) U.S. Cl.
CPC ............ *B32B 17/1099* (2013.01); *B32B 7/12* (2013.01); *B32B 17/064* (2013.01);
(Continued)

(58) Field of Classification Search
CPC ....... B32B 17/00; B32B 17/1099; B32B 7/00; B32B 2250/03; B32B 17/10981; B32B 17/10807
See application file for complete search history.

(56) References Cited

U.S. PATENT DOCUMENTS 2,744,044 A * 5/1956 Toulmin, Jr. ............ B29C 70/00
442/268
6,815,070 B1 11/2004 Burkle et al.
(Continued)

FOREIGN PATENT DOCUMENTS

| CN | 101815682 A | 8/2010 |
| JP | 2001-97733 A | 4/2001 |

(Continued)

OTHER PUBLICATIONS

International Search Report dated Sep. 27, 2016, issued in Counterpart of International Application No. PCT/JP2016/070640 (3 pages).
(Continued)

*Primary Examiner* — Michael N Orlando
*Assistant Examiner* — Abhishek A Patwardhan
(74) *Attorney, Agent, or Firm* — Westerman, Hattori, Daniels & Adrian, LLP

(57) ABSTRACT

Provided is a production method for an optical laminate, which is excellent in production efficiency even through use of a thin glass. The production method for an optical laminate of the present invention includes: a thin glass production step of producing a thin glass having a thickness of 100 μm or less; and a lamination step of laminating an optical film on one surface, or each of both surfaces, of the thin glass, the thin glass production step and the lamination step being performed in an integrated line, the lamination
(Continued)

step including bonding the optical film onto the thin glass under a state in which the thin glass is supported.

19 Claims, 2 Drawing Sheets

(51) Int. Cl.
*C03C 17/32* (2006.01)
*B32B 17/06* (2006.01)
*B32B 7/12* (2006.01)

(52) U.S. Cl.
CPC ........ *B32B 17/10027* (2013.01); *C03B 17/06* (2013.01); *C03C 17/32* (2013.01); *B32B 2250/03* (2013.01); *B32B 2250/05* (2013.01); *B32B 2250/40* (2013.01); *B32B 2255/10* (2013.01); *B32B 2255/26* (2013.01); *B32B 2305/72* (2013.01); *B32B 2307/536* (2013.01); *B32B 2307/546* (2013.01); *B32B 2309/105* (2013.01); *B32B 2309/14* (2013.01); *B32B 2310/0831* (2013.01); *B32B 2315/08* (2013.01); *B32B 2457/206* (2013.01)

(56) References Cited

U.S. PATENT DOCUMENTS

| 2010/0192634 | A1* | 8/2010 | Higuchi | B29C 66/7465 |
| | | | | 65/60.1 |
| 2013/0129987 | A1* | 5/2013 | Mitsugi | C03B 35/163 |
| | | | | 428/189 |
| 2015/0024149 | A1 | 1/2015 | Watanabe et al. | |
| 2015/0072125 | A1* | 3/2015 | Murashige | H01L 31/03926 |
| | | | | 428/216 |
| 2015/0165749 | A1* | 6/2015 | Tamagaki | B65H 39/16 |
| | | | | 156/499 |
| 2016/0342254 | A1* | 11/2016 | Motohashi | C08F 220/10 |

FOREIGN PATENT DOCUMENTS

| JP | 2001-350021 | A | 12/2001 |
| JP | 2002-299041 | A | 10/2002 |
| JP | 4122139 | B2 | 7/2008 |
| JP | 2013-14441 | A | 1/2013 |
| JP | 2013-121692 | A | 6/2013 |
| JP | 2014-215592 | A | 11/2014 |
| JP | 2015-7764 | A | 1/2015 |
| JP | 2015-104859 | A | 6/2015 |
| TW | 200936523 | A | 9/2009 |
| TW | 201345731 | A | 11/2013 |
| WO | 2013/114979 | A1 | 8/2013 |
| WO | 2014/171503 | A1 | 10/2014 |
| WO | 2014/171504 | A1 | 10/2014 |
| WO | 2014159168 | A1 | 10/2014 |

OTHER PUBLICATIONS

Office Action dated May 21, 2019, issued in counterpart JP Application No. 2015-141266, with English translation. (15 pages).
Extended (supplementary) European Search Report dated May 7, 2019, issued in counterpart EP Application No. 16824478.8. (6 pages).
English translation of International Search Report dated Sep. 27, 2016, issued in counterpart International Application No. PCT/JP2016/070640. (3 pages).
Office Action dated May 23, 2019, issued in counterpart CN Application No. 201680041612.2, with English translation (20 pages).
Office Action dated Sep. 27, 2019, issued in counterpart TW Application No. 105122461, with English translation. (9 pages).

* cited by examiner

METHOD FOR MANUFACTURING OPTICAL LAMINATE

TECHNICAL FIELD

The present invention relates to a method of producing an optical laminate.

BACKGROUND ART

An optical laminate formed of a glass material and an optical film has hitherto been used as a constituent member of an image display apparatus, such as a substrate for a display element, a sealing material of an OLED element, or an overall protective sheet. In general, such optical laminate is produced as follows: a glass material is produced, and then an optical film is bonded onto the glass material with an adhesive or an application liquid serving as a material for the optical film is applied onto the glass material. When the glass material is thin enough to be flexible, the glass material is produced into a roll shape, and the bonding or application is performed on glass fed from a roll.

Meanwhile, in recent years, weight saving and thinning of the image display apparatus have been progressing, and the use of a thinner glass material has been required. The glass material originally has poor handleability owing to its fragility. In this connection, when the glass material to be used as a material becomes thinner, its handleability poses a more remarkable problem, resulting in a reduction in production efficiency.

CITATION LIST

Patent Literature

[PTL 1] JP 4122139 B2

SUMMARY OF INVENTION

Technical Problem

The present invention has been made in order to solve the problem of the related art, and an object of the present invention is to provide a production method for an optical laminate, which is excellent in production efficiency even through use of a thin glass.

Solution to Problem

According to one embodiment of the present invention, there is provided a production method for an optical laminate, the production method including: a thin glass production step of producing a thin glass having a thickness of 100 μm or less; and a lamination step of laminating an optical film on one surface, or each of both surfaces, of the thin glass, the thin glass production step and the lamination step being performed in an integrated line, the lamination step including bonding the optical film onto the thin glass under a state in which the thin glass is supported.

In one embodiment, the lamination step includes: bonding a first optical film to one surface of the thin glass under a state in which the thin glass is supported; and bonding a second optical film to another surface of the thin glass under a state in which a laminate of the thin glass and the first optical film is supported.

In one embodiment, the thin glass is supported by a conveyor belt.

In one embodiment, the thin glass is supported by a support.

In one embodiment, the optical film has a modulus of elasticity at 23° C. of from 1.5 GPa to 10 GPa.

In one embodiment, the adhesive layer has a thickness of from 0.001 μm to 20 μm.

In one embodiment, the application layer formed through the application of the adhesive has a curing shrinkage rate of from 0.1% to 30%.

Advantageous Effects of Invention

According to the present invention, the thin glass production step and the step of laminating an optical film on the thin glass are performed in the integrated line, and hence the production method for an optical laminate, which is excellent in production efficiency even through use of a thin glass, can be provided.

DESCRIPTION OF EMBODIMENTS

Figure 1:
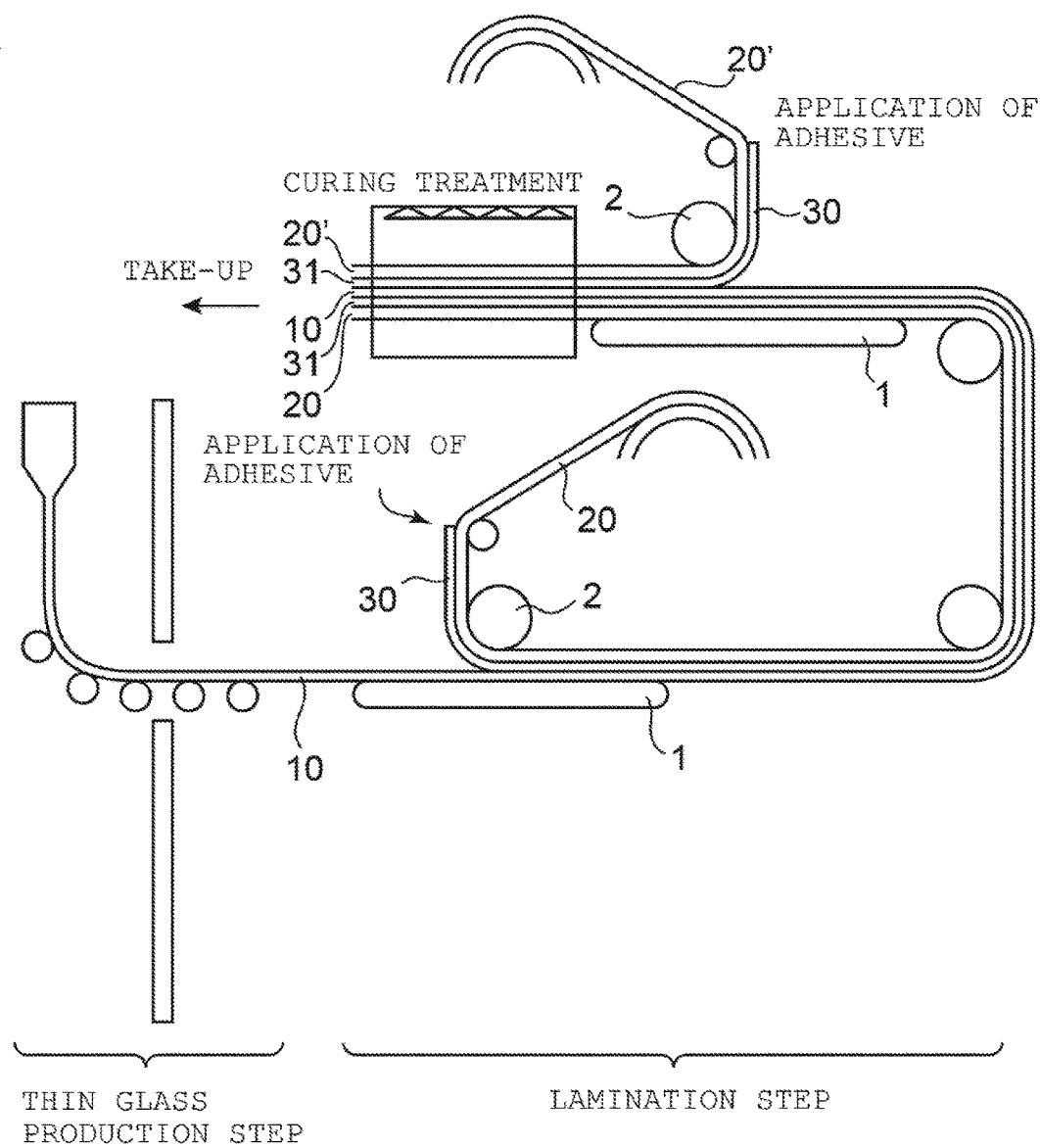
FIG. 1 is a view for illustrating a production method for an optical laminate according to one embodiment of the present invention.

FIG. 1 is a view for illustrating a production method for an optical laminate according to one embodiment of the present invention. It should be noted that each figure in this description is schematically illustrated so that a configuration is clearly shown and is not illustrated to scale. The production method for an optical laminate of this embodiment includes: (a) a step of producing a thin glass 10 (hereinafter sometimes referred to as thin glass production step); and (b) a step of laminating optical films 20 and 20' on the thin glass 10 (hereinafter sometimes referred to as lamination step). In the production method for an optical laminate of the present invention, the thin glass production step and the lamination step are performed in an integrated line. More specifically, the thin glass continuously formed in the thin glass production step is subjected to the lamination step as it is without being taken up.

A. Thin Glass Production Step

Any appropriate method may be adopted as a production method for the thin glass 10. The thin glass 10 is typically produced as follows: a mixture containing a main raw material, such as silica or alumina, an antifoaming agent, such as mirabilite or antimony oxide, and a reducing agent, such as carbon, is melted at a temperature of from 1,400° C. to 1,600° C., and formed into a thin sheet shape, followed by cooling. As a method of forming the thin glass 10 into a thin sheet, there are given, for example, a slot down-draw method, a fusion method, and a float method. The thin glass formed into a sheet shape by those methods may be chemically polished with a solvent such as hydrofluoric acid, as required, for further thinning the thin glass or increasing its smoothness.

A line speed in the thin glass production step is preferably 1 m/min or more, more preferably 5 m/min or more, still more preferably 10 m/min or more, particularly preferably 15 m/min or more, most preferably 20 m/min or more. The upper limit of the line speed is preferably 100 m/min or less, more preferably 60 m/min or less. In the present invention, the thin glass production step and the lamination step are performed in an integrated line, and hence the line speed in the thin glass production step and a line speed in the lamination step are the same, and these speeds also correspond to a line speed of the integrated line.

The thin glass 10 has a thickness of 100 μm or less, preferably 80 μm or less, more preferably 50 μm or less, still more preferably 40 μm or less, particularly preferably from 10 μm to 35 μm. In the present invention, even when the thin glass having an extremely small thickness is used, the glass is prevented from being broken, and hence an optical laminate can be obtained with high production efficiency.

The thin glass 10 has a width of preferably from 500 mm to 2,000 mm, more preferably from 750 mm to 1,500 mm.

The thin glass 10 preferably has a light transmittance at a wavelength of 550 nm of 85% or more. The thin glass 10 preferably has a refractive index ng at a wavelength of 550 nm of from 1.4 to 1.65.

The density of the thin glass 10 is preferably from 2.3 g/cm$^3$ to 3.0 g/cm$^3$, more preferably from 2.3 g/cm$^3$ to 2.7 g/cm$^3$. When the thin glass 10 has a density falling within the above-mentioned range, a lightweight optical laminate is obtained.

The thin glass 10 preferably has an elongated shape. The thin glass 10 has a length of, for example, from 10 m to 5,000 m, preferably from 50 m to 5,000 m.

The thin glass 10 formed into a predetermined thickness and a predetermined width in the thin glass production step is conveyed to the subsequent lamination step by any appropriate conveying method without being taken up in the thin glass production step. Examples of the conveying method include roll conveyance and belt conveyance.

B. Lamination Step

In the lamination step, an optical film is laminated on one surface, or each of both surfaces, of the thin glass. In ore embodiment, as in the illustrated example, the optical films 20 and 20' are laminated on both surfaces of the thin glass 10. Alternatively in another embodiment, an optical film is laminated on one of the surfaces of the thin glass, and a resin film is laminated on the other surface. The resin film mainly functions as a protective film configured to protect the thin glass. Alternatively, in still another embodiment, an optical film is laminated on one of the surfaces of the thin glass, and an optical laminate including the thin glass and the one optical film is produced.

Examples of each of the optical films 20 and 20' include a polarizing plate, a retardation plate, and an isotropic film.

Any appropriate material is used as a material for forming each of the optical films 20 and 20'. Examples of the material for forming each of the optical films 20 and 20' include a polyvinyl alcohol (PVA)-based resin, a polyolefin-based resin, a cyclic olefin-based resin, a polycarbonate-based resin, a cellulose-based resin, a polyester-based resin, a polyvinyl alcohol-based resin, a polyamide-based resin, a polyimide-based resin, a polyether-based resin, a polystyrene-based resin, a (meth)acrylic resin, a meth)acrylic urethane-based resin, a polysulfone-based resin, an acetate-based resin, an epoxy-based resin, and a silicone-based resin. In addition, a metal film, a metal oxide film, such as an ITO film, or a laminate film of the metal film and a resin film may also be used as each of the optical films 20 and 20'.

Any appropriate material is used as a material forming the resin film. A thermoplastic resin is preferably used as the material for forming the resin film. Examples of the resin include: a polyethersulfone-based resin; a polycarbonate-based resin; an acrylic resin; polyester-based resins, such as a polyethylene terephthalate-based resin and a polyethylene naphthalate-based resin; a polyolefin-based resin; cycloolefin-based resins, such as a norbornene-based resin; a polyimide-based resin; a polyamide-based resin; a polyimide amide-based resin; a polyarylate-based resin; a polysulfone-based resin; and a polyether imide based resin. Alternatively, cross-linking resins, such as an epoxy-based resin, a urethane-based resin, and a silicone-based resin, may be used.

The optical films 20 and 20' and the resin film each have a modulus of elasticity at 23° C. of preferably from 1.5 GPa to 10 GPa, more preferably from 1.8 GPa to 9 GPa, still more preferably from 1.8 GPa to 8 GPa. When the optical films 20 and 20' and the resin film each have a modulus of elasticity falling within the above-mentioned range, a high protective effect is exhibited on the thin glass, and the production method for an optical laminate excellent in production efficiency can be provided. In the present invention, the modulus of elasticity may be measured through dynamic viscoelastic spectrum measurement.

The thickness of each of the optical films 20 and 20' may be set to any appropriate thickness depending on the application of each optical film. The thickness of each of the optical films 20 and 20' for example, from 1 μm to 300 μm, preferably from 5 μm to 200 μm. The thickness of the resin film is preferably from 1 μm to 60 μm, more preferably from 10 μm to 50 μm, still more preferably from 20 μm to 40 μm.

The optical films 20 and 20' and the resin film each have a width of preferably from 300 mm to 2,200 mm, more preferably from 500 mm to 2,000 mm still more preferably from 500 mm to 800 mm. When the films are arranged on both surfaces of the thin glass 10, these films may have the same width or different widths.

In one embodiment, the optical films 20 and 20' and the resin film each have a width smaller than that of the thin glass. When the optical films 20 and 20' and the resin film each have a width smaller than that of the thin glass, skewing and meandering of the thin glass can be corrected through edge detection of an edge portion of the thin glass in a width direction after the lamination step. As a result, the thin glass is prevented from being broken while being taken up. Alternatively, in another embodiment, the optical films 20 and 20' and the resin film each have a width larger than that of the thin glass 10. When the optical films 20 and 20' and the resin film each have a width larger than that of the thin glass 10, the end portion of the thin glass 10 is protected, and thus the thin glass 10 can be prevented from being broken in the course of the step.

The optical films 20 and 20' and the resin film each preferably have an elongated shape. The lamination of those films may be continuously performed on the thin glass 10 having an elongated shape. In addition, the optical films 20 and 20 and the resin film each have the same length as or a different length from that of the thin glass 10. In addition, when the films are arranged on both surfaces of the thin glass 10, these films may have the same length or different lengths.

In one embodiment, the optical films 20 and 20 are each laminated on the thin glass through intermediation of an adhesive layer 31. Any appropriate method may be adopted as a method of forming the adhesive layer 31. It is preferred that, in the lamination step, an adhesive be applied onto the optical films 20 and 20' to form application layers 30, and then the thin glass 10 and the optical films 20 and 20 be bonded to each other through intermediation of the application layers 30, followed by curing the adhesive. By curing the adhesive (that is, the application layers 30), the adhesive layers 31 are formed. In the present invention, the thin glass production step and the lamination step are per formed in an integrated line, and hence the thin glass production step and the lamination step have the same line speed. In addition, a line speed in glass production generally becomes faster as a glass to be produced has a smaller thickness. In the present invention, the thin glass to be produced in the thin glass production step has an extremely small thickness, and hence an overall line speed of the integrated line becomes fast, and also the line speed in the lamination step becomes fast. In the product ion method having such configuration, in which the thin glass and the optical film are bonded to each other after the formation of the application layer of the adhesive, and the adhesive layer is formed by curing the adhesive as described above, an inconvenience, such as a bonding failure, can be prevented, and in addition, a line length can be shortened.

Any appropriate adhesive is used as the adhesive. Examples of the adhesive include adhesives containing a resin having a cyclic ether group, such as an epoxy group, a glycidyl group, or an oxetanyl group, an acrylic resin, and a silicone-based resin. Of those, a UV-curable adhesive is preferably used. When the films are arranged on both surfaces of the thin glass 10, the adhesives to be applied onto both surfaces of the thin glass 10 may be of the same kind or different kinds.

As a method of applying the adhesive, there are given: coating methods, e.g., air doctor coating, blade coating, knife coating, reverse coating, transfer roll coating, gravure roll coating, kiss coating, cast coating, spray coating, slot orifice coating, calender coating, electrocoating, dip coating, and die coating; and printing methods, e.g., relief printing methods, such as flexographic printing, intaglio printing methods such as a direct gravure printing method and an offset gravure printing method, litho printing methods, such as an offset printing method, and stencil printing methods, such as a screen printing method.

The application layer 30 of the adhesive has a thickness of preferably from 0.001 μm to 20 μm, more preferably from 0.005 μm to 20 μm, still more preferably from 0.01 μm to 10 μm, particularly preferably from 0.1 μm to 10 μm. When the films are arranged on both surfaces of the thin glass 10, the application layers to be formed on both surfaces of the thin glass 10 may have the same thickness or different thicknesses.

In one embodiment, the thin glass 10 and the optical films 20 and 20' are bonded to each other after a predetermined interval after the formation of the application layers on the optical films 20 and 20' through the application of the adhesive.

The adhesive may be semi-cured after the formation of the application layers 30 on the optical films 20 and 20' through the application of the adhesive and before the bonding of the thin glass 10 and the optical films 20 and 20'.

In the present invention, the optical films 20 and 20' are bonded onto the thin glass 10 under a state in which the thin glass 10 is supported. The "state in which the thin glass is supported" means a state in which a thin glass (or a laminate of a thin glass and an optical film or a resin film) to be conveyed is supported by a conveying mechanism of a production apparatus.

In one embodiment, as illustrated in FIG. 1, the thin glass 10 is supported by a conveyor belt 1. That is, the thin glass 10 and each of the optical films 20 and 20' are bonded to each other while the thin glass 10 is supported by the conveyor belt 1. The thin glass and the optical film are preferably bonded to each other by causing the thin glass and the optical film to run between the conveyor belt 1 and a roll 2. It is preferred that an optical film having formed thereon the application layer of the adhesive be supplied to the lamination step. A gap between the conveyor belt 1 and the roll 2 is preferably from 50% to 99%, more preferably from 60% to 99%, still more preferably from 70% to 99%, particularly preferably from 60% to 99%, most preferably from 90% to 98% with respect to the total thickness of the thin glass, the application layer of the adhesive, and the optical film. In addition, the roll to be used for the bonding has a rubber hardness of preferably from 50 degrees to 95 degrees, more preferably from 50 degrees to 90 degrees. The rubber hardness is measured in conformity with JIS K-6253 (A type).

Figure 2:
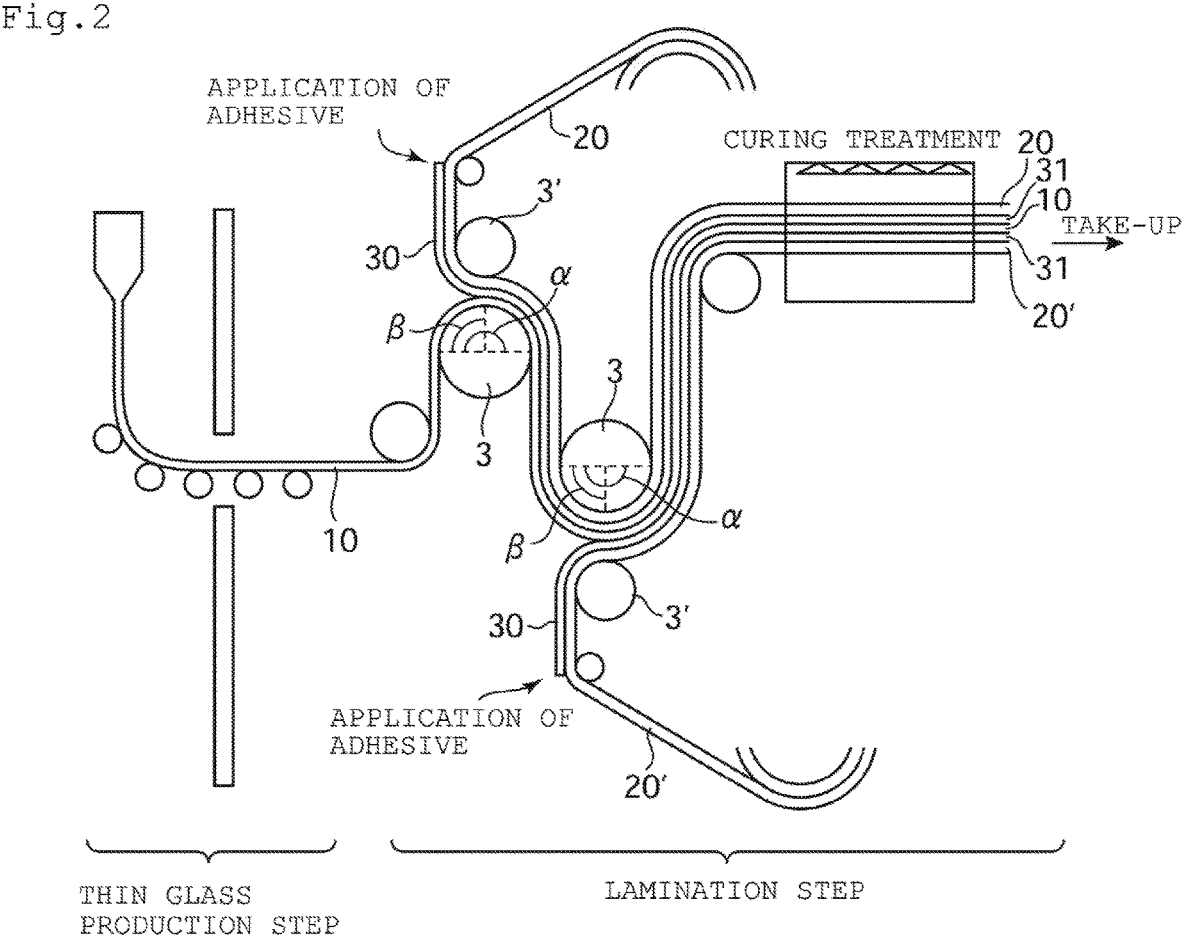
FIG. 2 is a view for illustrating a production method for an optical laminate according to another embodiment of the present invention.

In another embodiment, as illustrated in FIG. 2, the thin glass 10 is supported by a support roll 3. That is, the thin glass and the optical film are bonded to each other while the thin glass 10 is held by the support roll 3 at a large holding angle and is thus supported by the support roll 3. The thin glass and the optical film are preferably bonded to each other by causing the thin glass and the optical film to run between a pair of rolls (that is, between the support roll 3 and a roll 3' opposite to the support roll 3 (hereinafter sometimes referred to as counter roll 3')). As materials for forming the surface of the support roll 3 and the surface of the counter roll 3' (surface to be brought into contact with the optical film), there are preferably given, for example, rubber and iron. The material for forming the surface of the support roll 3 and the material for forming the surface of the counter roll 3' may be the same or different. It is preferred that at least any one of the support roll 3 or the counter roll 3' has a rubber surface. This is because a load applied to the thin glass can be reduced. It is preferred that an optical film having formed thereon the application layer of the adhesive be supplied to the lamination step also in this embodiment.

A holding angle α for the thin glass 10 at which the thin glass 10 is supported by the support roll 3 is preferably from 30° to 220°, more preferably from 45° to 200°. The holding angle α refers to an angle formed by: a point at Which the thin glass. 10 (or a laminate of the thin glass and the starts to run on the support roll 3; the center of the axis of the support roll 3; and a point at which the thin glass 10 (or the laminate of the thin glass and the film) separates from the support roll 3. In addition, an angle β (the angle β in FIG. 2) formed by: the point at which the thin glass 10 (or the laminate of the thin glass and the film) starts to run on the support roll 3; the center of the axis of the support roll 3 and a point at which the thin glass and the optical film are bonded to each other on the support roll 3 is preferably from 10% to 90% of the holding angle α, more preferably from 20% to 80% of the holding angle α, still more preferably from 30% to 70% of the holding angle α.

The support roll 3 has a diameter of preferably from 50 mm to 300 mm, more preferably from 60 mm to 250 mm, still more preferably from 100 mm to 200 mm.

When the thin glass 10 is supported by the support roll 3, a gap between the pair of rolls (that is, a gap between the support roll 3 and the roll 3' opposite to the support roll 3) is preferably from 50% to 99%, more preferably from 80% to 99%, still more preferably from 90% to 98% with respect to the total thickness of the thin glass, the application layer of the adhesive, and the optical film. In addition, the rolls to be used for the bonding each have a rubber hardness of preferably from 50 degrees to 95 degrees, more preferably from 50 degrees to 90 degrees. The rubber hardness is measured in conformity with JIS K-6253 (A type).

In one embodiment, the thin glass is inserted into the pair of rolls from below at the time of bonding (that is, the thin glass is caused to run upward). With this, the thin glass and the optical film can be bonded to each other while a situation in which the thin glass is accompanied by air is prevented, because the rolls are configured to rotate in a direction opposite to an own weight direction of air (downward direction). As a result, a failure in adhesiveness between the thin glass and the optical film, and an outer appearance failure of the optical laminate can be prevented. In addition, in order to prevent air from being taken in between the thin glass and the optical film, for example, a method involving increasing a pressure applied by the rolls or increasing the hardness of each roll to an extent not to break the thin glass may be adopted.

When the optical films 20 and 20' are bonded to both surfaces of the thin glass 10, the two optical films may be bonded onto the thin glass 10 at different timings. More specifically, as illustrated in FIG. 1 and FIG. 2, a first optical film 20 is bonded to one of the surfaces of the thin glass 10 under a state in which the thin glass 10 is supported, and then, a second optical film 20' is bonded to the other surface of the thin glass 10 under a state in which a laminate of the thin glass 10 and the first optical film 20 is supported. In such bonding of the optical films to both surfaces of the thin glass, a method of supporting the thin glass at the time of bonding the first optical film and a method of supporting the thin glass at the time of bonding the second optical film may be the same or different. As a mode of supporting the thin glass by different methods, there is given, for example, a mode of bonding one of the optical films while supporting the thin glass by a conveyor belt, and bonding the other optical film while supporting the thin glass by a support roll.

As described above, when the optical films are bonded onto the thin glass under a state in which the thin glass is supported, fluttering of the thin glass is suppressed, and hence the thin glass can be prevented from being broken. The production method for an optical laminate of the present invention can prevent the breakage of the thin glass even at high integrated line speed and is extremely excellent in production efficiency.

Also for bonding of the resin film to the thin glass, a method similar to the above-mentioned method for the optical film may be adopted.

It is preferred that, after each of the optical films 20 and 20' is bonded to the thin glass 10, the application layer 30 of the adhesive be cured. As a method of curing the adhesive, there is given, for example, a method of curing the adhesive through ultraviolet light irradiation and/or heat treatment. Typical ultraviolet light irradiation conditions are as follows: a cumulative irradiation light amount of from 100 mJ/cm$^2$ to 2,000 mJ/cm$^2$, preferably from 200 mJ/cm$^2$ to 1,000 mJ/cm$^2$. Typical heat treatment conditions are as follows: a heating temperature of from 100° C. to 200° C. and a heating time of from 5 minutes to 20 minutes.

The adhesive is preferably cured through ultraviolet ray irradiation. The curing of the adhesive through ultraviolet ray irradiation easily responds to thinning of glass and increase of the line speed.

The curing shrinkage rate of the application layer of the adhesive is preferably from 0.1% to 30%, more preferably from 0.5% to 20%. The "curing shrinkage rate of the application layer of the adhesive" refers to a volume change rate when the application layer of the adhesive is cured to form the adhesive layer, and is calculated based on the expression: {(volume of application layer-volume of adhesive layer)/volume of application layer}. The curing shrinkage rate may be measured with a cure shrinkage sensor manufactured by Sentech "resin cure shrinkage stress measuring device EU201C". The details of a method of measuring the curing shrinkage rate are described in JP 2013-104869 A, which is incorporated herein by reference.

In one embodiment, when the optical films are laminated on both surfaces of the thin glass, the adhesive is cured after the optical films are bonded to both surfaces of the thin glass. In another embodiment a first optical film is bonded to one of the surfaces of the thin glass, followed by curing an adhesive arranged between the thin glass and the first optical film, and then, a second optical film is bonded to the other surface of the thin glass, followed by curing an adhesive arranged between the thin glass and the second optical film.

Also when the resin film is laminated on the thin glass, the thin glass and the resin film may be laminated on each other by curing the adhesive as described above.

By curing the adhesive as described above, the adhesive layer 31 is formed between the thin glass 10 and each of the optical films 20 and 20'. As a result, an optical laminate is obtained.

The adhesive layer 31 has a thickness of preferably from 0.001 μm to 20 μm, more preferably from 0.01 μm to 10 μm. The adhesive layer 31 having such thickness has less influence on transparency of a transparent substrate, and can exhibit sufficient adhesive force even under high temperature and high humidity conditions.

In the production method of the present invention, the thin glass may be slit at both ends in a width direction at any appropriate timing. The thin glass can be prevented from being broken when both ends of the thin glass in a width direction, which have been damaged in the thin glass production step, are slit to be removed.

In one embodiment, the slitting is performed before the bonding the thin glass and the optical film (that is, under the state of the thin glass alone). In another embodiment, the slitting is performed after the lamination of the thin glass and the optical film and before a take-up step described below.

In one embodiment, the optical laminate produced as described above is subjected to a take-up step. An optical laminate taken up in a roll shape is obtained through the take-up step. Thus, the integrated process is completed. In addition, after the lamination step, that is, after the optical laminate has been formed, the optical laminate may be subjected to any appropriate treatment and then taken up.

INDUSTRIAL APPLICABILITY

The optical laminate obtained by the production method of the present invention can be suitably used as a substrate for a display element, a seal ink material of an OLEO element, an overall protective sheet, or the like.

REFERENCE SIGNS LIST 10 thin glass
20, 20' optical film
30 application layer
31 adhesive layer

The invention claimed is:
1. A production method for an optical laminate, the production method comprising:
   a thin glass production step of producing a thin glass having a thickness of 100 μm or less; and
   a lamination step of laminating an optical film on one surface, or each of both surfaces, of the thin glass,
   wherein the thin glass production step and the lamination step are performed in an integrated line, wherein, in the lamination step, an adhesive is applied onto the optical film to form an application layer, and then the thin glass and the optical film are bonded to each other through intermediation of the application layer, and wherein the lamination step comprises bonding the optical film onto the thin glass under a state in which the thin glass is supported according to (i) or (ii):

(i) the thin glass is supported by a conveyor belt at a position which is opposite to a position at which a roller laminates the optical film to the thin glass, such that when the thin glass is supported by the conveyor belt, a gap between the conveyor belt and the roller is from 50% to 99% with respect to a total thickness of the thin glass, the application layer of the adhesive, and the optical film (ii) the thin glass is supported by a support roller at a position which is opposite to a position at which a counter roll laminates the optical film to the thin glass, such that an angle α formed by a point at which the thin glass starts to run on the support roll, an axial center of the support roll, and a point at which the thin glass separates from the support roll is 30° to 220°, and such that an angle β formed by the point at which the thin glass starts to run on the support roll, the axial center of the support roll, and a point at which the thin glass is laminated to the optical film is 10% to 90% of the angle α.

2. A production method for an optical laminate, the production method comprising:

a thin glass production step of producing a thin glass having a thickness of 100 μm or less; and a lamination step of laminating optical films on both surfaces of the thin glass, wherein the thin glass production step and the lamination step are performed in an integrated line, wherein the lamination step comprises:

bonding a first optical film to one surface of the thin glass under a state in which the thin glass is supported; and bonding a second optical film to another surface of the thin glass under a state in which a laminate of the thin glass and the first optical film is supported, and wherein, in the lamination step, an adhesive is applied onto the first optical film to form an application layer, and then the thin glass and the first optical film are bonded to each other through intermediation of the application layer, and wherein the first optical film is bonded to the one surface of the thin glass according to situation (i) or (ii):

(i) the thin glass is supported by a conveyor belt at a position which is opposite to a position at which a roller laminates the first optical film to the thin glass such that when the thin glass is supported by the conveyor belt, a gap between the conveyor belt and the roller is from 50% to 99% with respect to a total thickness of the thin glass, the application layer of the adhesive, and the first optical film (ii) the thin glass is supported by a support roller at a position which is opposite to a position at which a counter roll laminates the first optical film to the thin glass such that an angle α formed by a point at which the thin glass starts to run on the support roll, an axial center of the support roll, and a point at which the thin glass separates from the support roll is 30° to 220°, and such that an angle β formed by the point at which the thin glass starts to run on the support roll, the axial center of the support roll, and a point at which the thin glass is laminated to the first optical film is 10% to 90% of the angle α.

3. The production method for an optical laminate according to claim 1, wherein the thin glass is supported by the conveyor belt at the position which is opposite to the position at which the roller laminates the optical film to the thin glass such that when the thin glass is supported by the conveyor belt, a gap between the conveyor belt and the roller is from 50% to 99% with respect to a total thickness of the thin glass, the application layer of the adhesive, and the first optical film.

4. The production method for an optical laminate according to claim 1, wherein the thin glass is supported by the support roller at the position which is opposite to the position at which the counter roll laminates the optical film to the thin glass such that the angle α formed by a point at which the thin glass starts to run on the support roll, the axial center of the support roll, and the point at which the thin glass separates from the support roll is 30° to 220°, and such that the angle β formed by the point at which the thin glass starts to run on the support roll, the axial center of the support roll, and the point at which the thin glass is laminated to the optical film is 10% to 90% of the angle α.

5. The production method for an optical laminate according to claim 1, wherein the optical film has a modulus of elasticity at 23° C. of from 1.5 GPa to 10 GPa.

6. The production method for an optical laminate according to claim 1, wherein an adhesive layer disposed between the optical film and the thin glass has a thickness of from 0.001 μm to 20 μm.

7. The production method for an optical laminate according to claim 1, wherein an application layer formed through application of an adhesive disposed between the optical film and the thin glass has a curing shrinkage rate of from 0.1% to 30%.

8. The production method for an optical laminate according to claim 4, wherein the angle β is 20% to 80% of the angle α.

9. The production method for an optical laminate according to claim 4, wherein the angle β is 30% to 70% of the angle α.

10. The production method for an optical laminate according to claim 4, wherein the angle α is 45° to 200°.

11. The production method for an optical laminate according to claim 10, wherein the angle β is 20% to 80% of the angle α.

12. The production method for an optical laminate according to claim 10, wherein the angle β is 30% to 70% of the angle α.

13. The production method for an optical laminate according to claim 2, wherein the thin glass is supported by the conveyor belt at the position which is opposite to the position at which the roller laminates the first optical film to the thin glass such that when the thin glass is supported by the conveyor belt, a gap between the conveyor belt and the roller is from 50% to 99% with respect to a total thickness of the thin glass, the application layer of the adhesive, and the first optical film.

14. The production method for an optical laminate according to claim 2, wherein the thin glass is supported by the support roller at the position which is opposite to the position at which the counter roll laminates the first optical film to the thin glass such that the angle α formed by a point at which the thin glass starts to run on the support roll, the axial center of the support roll, and the point at which the thin glass separates from the support roll is 30° to 220°, and such that the angle β formed by the point at which the thin glass starts to run on the support roll, the axial center of the support roll, and the point at which the thin glass is laminated to the first optical film is 10% to 90% of the angle α.

15. The production method for an optical laminate according to claim 14, wherein the angle β is 20% to 80% of the angle α.

16. The production method for an optical laminate according to claim 14, wherein the angle β is 30% to 70% of the angle α.

17. The production method for an optical laminate according to claim 14, wherein the angle α is 45° to 200°.

18. The production method for an optical laminate according to claim 17, wherein the angle β is 20% to 80% of the angle α.

19. The production method for an optical laminate according to claim 17, wherein the angle β is 30% to 70% of the angle α.

* * * * *